(12) United States Patent
Huang et al.

(10) Patent No.: US 6,317,402 B1
(45) Date of Patent: Nov. 13, 2001

(54) DISK TRAY OF OPTIC DISK DRIVE HAVING PRESSURE BALANCE DEVICE

(75) Inventors: Chieny Huang, Taipei; George Chen, Taoyuan, both of (TW)

(73) Assignee: Behavior Tech Computer Corporation, Taipei (TW)

( * ) Notice: Subject to any disclaimer, the term of this patent is extended or adjusted under 35 U.S.C. 154(b) by 0 days.

(21) Appl. No.: 09/447,304

(22) Filed: Nov. 23, 1999

(51) Int. Cl.[7] ............................. G11B 33/14; G11B 17/03
(52) U.S. Cl. ........................................................ 369/77.1
(58) Field of Search .......................... 360/97.02, 98.07, 360/98.08, 99.04, 99.05, 99.08, 99.12; 369/77.1, 77.2, 75.1, 75.2

(56) References Cited

U.S. PATENT DOCUMENTS

| | | | | |
|---|---|---|---|---|
| 4,510,508 | * | 4/1985 | Janssen | 346/135.1 |
| 4,561,085 | * | 12/1985 | Funabashi | 369/77.1 |
| 5,255,256 | * | 10/1993 | Engler et al. | 369/77.2 |
| 5,537,270 | * | 7/1996 | Morehouse et al. | 360/97.02 |
| 5,732,063 | * | 3/1998 | Chen | 369/263 |
| 5,844,747 | * | 12/1998 | Wang | 360/97.02 |
| 5,878,013 | * | 3/1999 | Maeda | 369/77.1 |
| 6,088,190 | * | 7/2000 | Anderson | 360/97.02 |
| 6,144,522 | * | 11/2000 | Myokan et al. | 360/97.02 |
| 6,169,712 | * | 1/2001 | Yoshimura | 369/36 |
| 6,208,484 | * | 3/2001 | Vouights | 360/97.02 |
| 6,212,147 | * | 4/2001 | Ishihara | 369/77.1 |

FOREIGN PATENT DOCUMENTS

| | | | |
|---|---|---|---|
| 08339678-A | * | 12/1996 | (JP). |
| 411126470-A | * | 5/1999 | (JP). |

* cited by examiner

*Primary Examiner*—David L. Ometz
*Assistant Examiner*—Franklin D. Altman, III
(74) *Attorney, Agent, or Firm*—Rosenberg, Klein & Lee

(57) ABSTRACT

A disk tray is mounted in an optic disk drive for supporting an optic disk. The disk tray forms a circular recess for receiving the optic disk therein. Openings are defined in the disk tray along a circumference of the circular recess for forming air passages communicating upper and lower sides of the disk tray whereby when the optic disk is rotated at a high speed during the operation of the optic disk drive, pressure difference induced between the upper and lower sides of the disk tray is reduced by air flowing through the air passages.

1 Claim, 3 Drawing Sheets

DISK TRAY OF OPTIC DISK DRIVE HAVING PRESSURE BALANCE DEVICE

FIELD OF THE INVENTION

The present invention generally relates to a disk tray of an optic disk drive, and in particular to a disk tray of an optic disk drive having a pressure balance device for reducing vibration of the disk caused by pressure difference induced by high speed rotation of the optic disk.

BACKGROUND OF THE INVENTION

Optic disk drives are commonly used as standard peripheral devices of personal computers. The operation speed of the optic disk drives has been and is being improved to such an extent that a pressure difference is induced during the operation of the disk drive which causes vibration of the optic disk leading to mistaken access of data stored in the disk.

Thus, it is desired to have a disk tray of an optic disk drive that alleviates or even eliminates the vibration caused by pressure difference induced during the operation of the optic disk drive.

SUMMARY OF THE INVENTION

Accordingly, an object of the present invention is to provide a device for alleviating the vibration of an optic disk during the operation of an optic disk drive.

Another object of the present invention is to provide a disk tray of an optic disk drive which overcomes the disk vibration caused by pressure difference induced by high speed rotation of the optic disk during operation of the optic disk drive.

A further object of the present invention is to provide a disk tray of an optic disk drive which allows pressure difference between upper and lower sides thereof to be balanced without addition of sophisticated devices anchor modification of the general structure of the disk tray.

To achieve the above objects, in accordance with the present invention, there is provided a disk tray adapted to be arranged in an optic disk drive for supporting an optic disk. The disk tray forms a circular recess for receiving the optic disk therein. Openings are defined in the disk tray along a circumference of the circular recess for forming air passages communicating upper and lower sides of the disk tray whereby when the optic disk is rotated at a high speed during the operation of the optic disk drive, pressure difference induced between the upper and lower sides of the disk tray is reduced by air flowing through the air passages.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
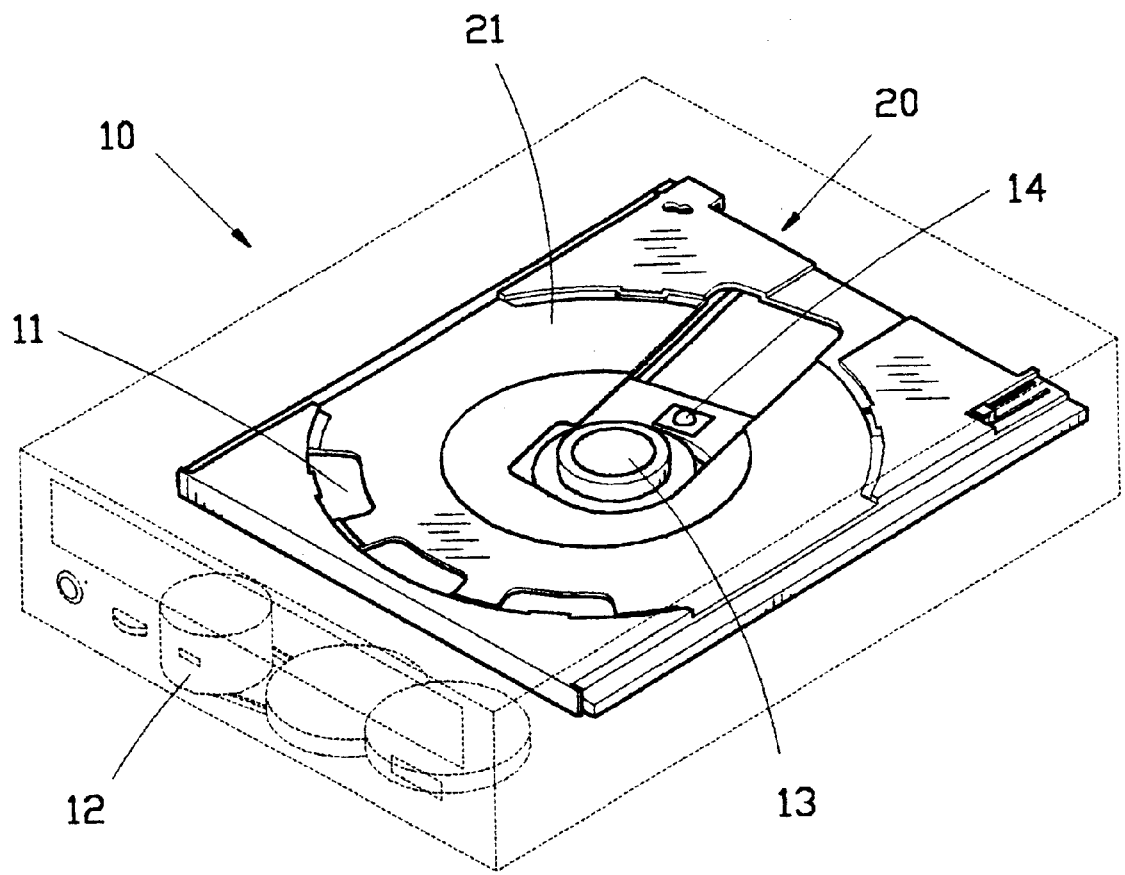
FIG. 1 is a schematic view of an optic disk drive comprising a disk tray constructed in accordance with the present invention.

With reference to the drawings and in particular to FIG. 1, an optic disk drive 10 comprises a chassis 11 inside which a disk tray 20 for supporting an optic disk (not shown), a disk turning device 13 drivingly engageable with the optic disk for rotating the optic disk at a high speed, a driving unit 12 mechanically coupled to and driving the disk turning device 13 and a reading head 14 movable with respect to the disk tray 20 for picking up data signal from the optic disk are mounted.

Figure 2:
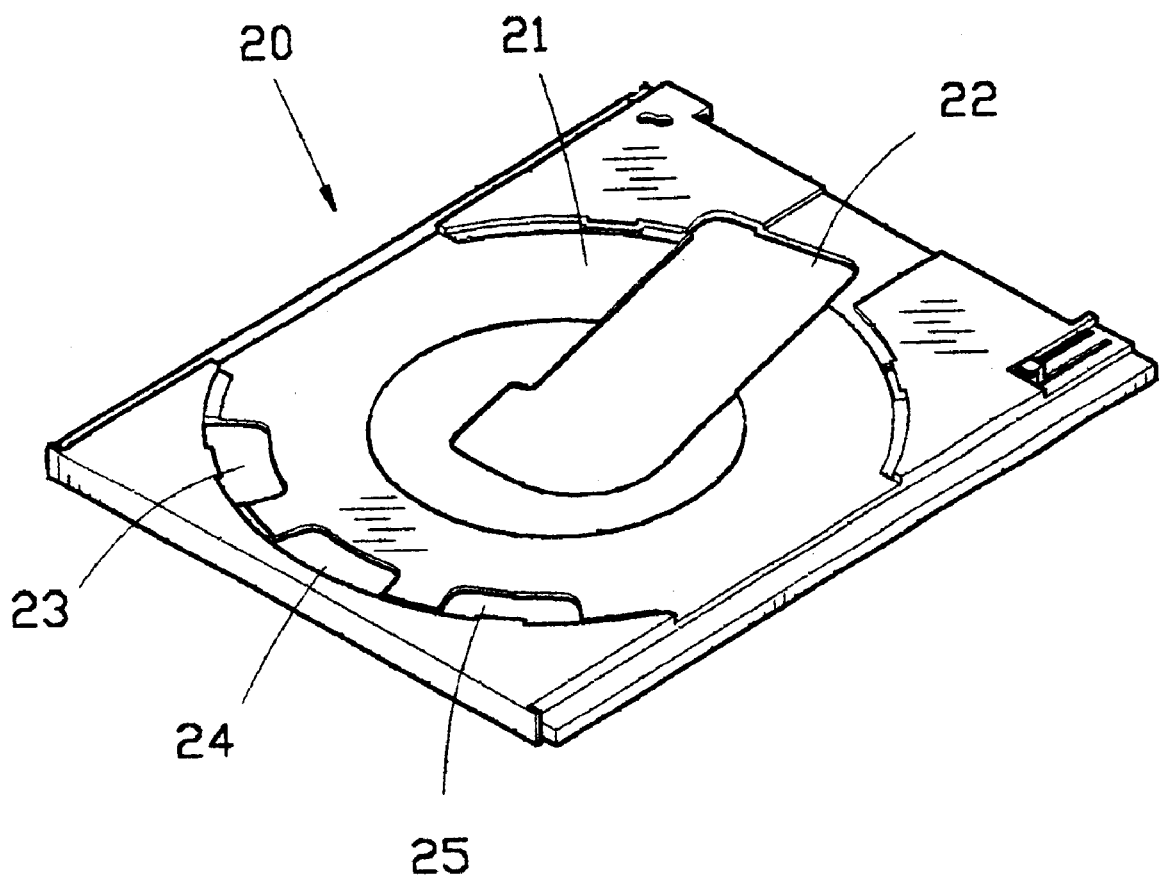
FIG. 2 is a perspective view of the disk tray of the present invention.
Figure 3:
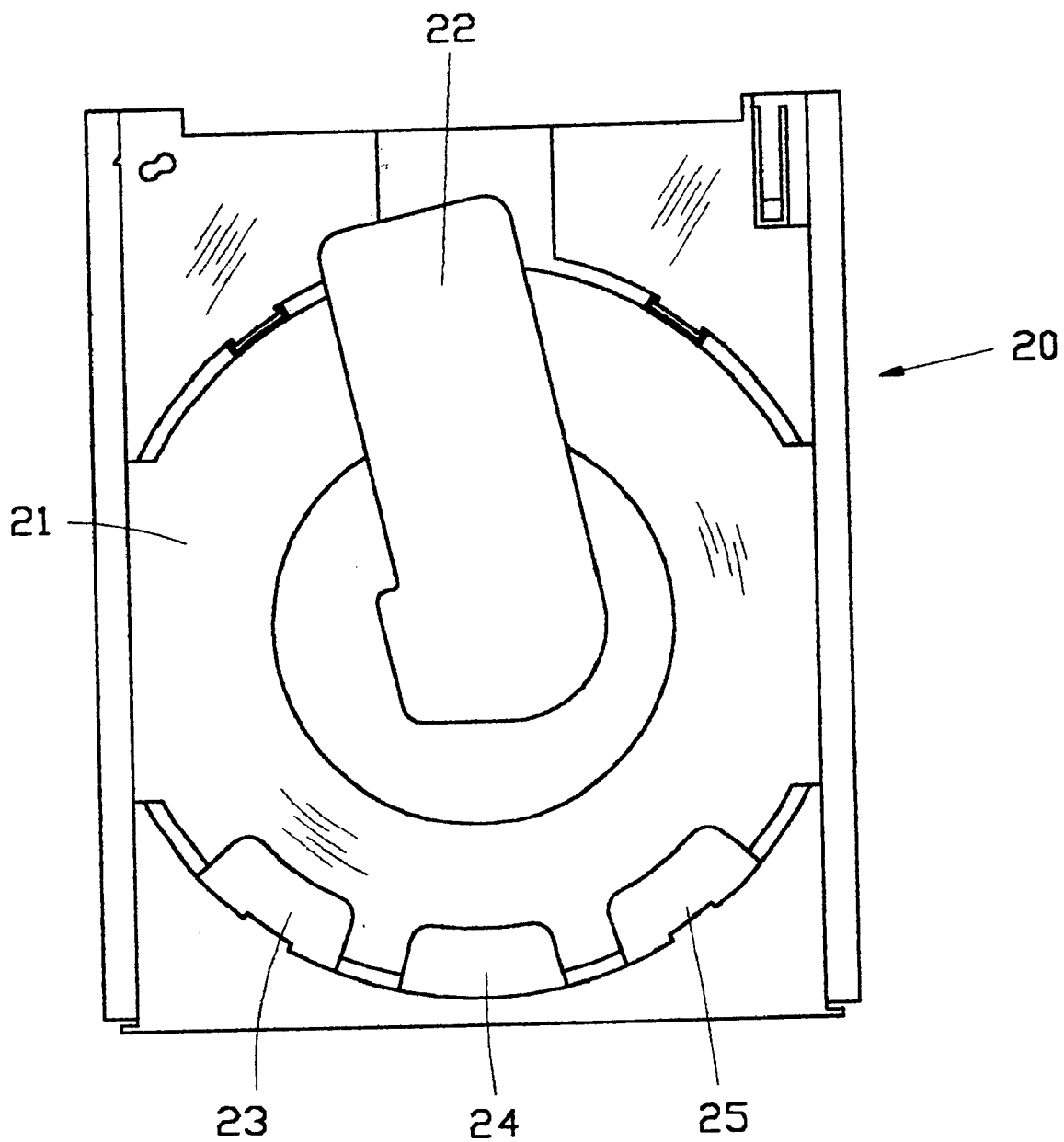
FIG. 3 is a top plan view of the disk tray of the present invention.

Also referring to FIGS. 2 and 3, the disk tray 20 comprises a plate-like tray body (not labeled) forming a central circular recess 21 sized to receive an optic disk therein. A radially extending slot 22 is defined in the disk tray 20 for accommodating the movement of the reading head 14 to position the reading head 14 on a desired location of the optic disk. A plurality of spaced openings 23, 24, 25 is defined in the circular recess 21 along a circumference thereof. The openings 23, 24, 25 form air passages communicating upper and lower sides of the disk tray 20, serving as pressure balance device of the present invention.

When an optic disk is deposited in the circular recess 21 of the disk tray 20 and the optic disk drive 10 is actuated, the optic disk is rotated at a high speed by the disk turning device 13 driven by the driving unit 12. The reading head 14 may be moved along the slot 22 for positioning the reading head 14 on any desired location of the optic disk to read data therefrom.

The high speed rotation of the optic disk induces a pressure difference between the upper and lower sides of the disk tray 20 which forces air to flow through the openings 23, 24, 25 thereby reducing the pressure difference. Vibration of the optic disk caused by the pressure difference during the operation thereof is thus significantly alleviated.

Although the openings 23, 24, 25 are shown to be rectangular in shape and three in number, the shape and the number of the openings 23, 24, 25 may be varied as desired provided at least an air passage is formed between upper and lower sides of the disk tray 20 for balance of pressure therebetween.

The disk tray 20 constructed in accordance with the present invention can effectively reduce the pressure difference between the upper and lower sides thereof without addition of sophisticated devices or significant modification of the general structure of the disk tray 20 whereby the manufacture and cost of the disk tray substantially remain the same as compared to the conventional disk tray.

Although the present invention has been described with respect to the preferred embodiment, it is contemplated that a variety of modifications, variations and substitutions may be done without departing from the scope of the present invention that is intended to be defined by the appended claims.

What is claimed is:

1. A disk tray adapted to be mounted in an optical disk drive and support an optical disk selectively rotated at a high speed when the optical disk drive is actuated, the disk tray comprising a tray body having upper and lower opposing sides, the tray body having a circular recess formed in the upper side thereof for receiving an optical disk therein, the circular recess having a bottom surface with a plurality of openings formed therethrough, the plurality of openings defining air passages for substantially equalizing air pressure differences between the upper and lower sides of the tray body when the optical disk is rotated, the plurality of air passages being disposed adjacent a circumference of the circular recess in angularly spaced and radially aligned relationship with respect to a rotation axis of the optical disk.

* * * * *